US010772098B2

(12) United States Patent
Cordeiro et al.

(10) Patent No.: US 10,772,098 B2
(45) Date of Patent: *Sep. 8, 2020

(54) APPARATUS, SYSTEM AND METHOD OF COMMUNICATING AN ENHANCED DIRECTIONAL MULTI GIGABIT (EDMG) SUPPORT INDICATION

(71) Applicant: INTEL IP CORPORATION, Santa Clara, CA (US)

(72) Inventors: Carlos Cordeiro, Portland, OR (US); Solomon B. Trainin, Haifa (IL); Chittabrata Ghosh, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/112,725

(22) Filed: Aug. 26, 2018

(65) Prior Publication Data
US 2019/0116595 A1 Apr. 18, 2019

Related U.S. Application Data

(63) Continuation of application No. 15/200,022, filed on Jul. 1, 2016, now Pat. No. 10,085,261.
(Continued)

(51) Int. Cl.
*H04W 72/04* (2009.01)
*H04W 48/12* (2009.01)
(Continued)

(52) U.S. Cl.
CPC ..... *H04W 72/0453* (2013.01); *H04W 40/244* (2013.01); *H04W 48/12* (2013.01); *H04W 88/02* (2013.01)

(58) Field of Classification Search
CPC . H04L 2012/5608; H04L 41/12; H04L 45/02; H04L 45/00; H04L 45/04;
(Continued)

(56) References Cited

U.S. PATENT DOCUMENTS 10,085,261 B2 * 9/2018 Cordeiro ............. H04W 40/244
10,187,497 B1 * 1/2019 Sun ......................... H04L 69/22
(Continued)

FOREIGN PATENT DOCUMENTS

KR 20130018308 2/2013
WO 2014074894 5/2014

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Brenda H Pham
(74) *Attorney, Agent, or Firm* — Shichrur & Co.

(57) ABSTRACT

Some demonstrative embodiments include apparatuses, devices, systems and methods of communicating an Enhanced Directional Multi Gigabit (EDMG) support indication. For example, a wireless station may be configured to generate a frame having a structure compatible with a Directional Multi Gigabit (DMG) frame structure, the frame including an EDMG supported field to indicate that the wireless station supports one or more EDMG features; and to transmit the frame over a DMG channel.

16 Claims, 9 Drawing Sheets

Related U.S. Application Data

(60) Provisional application No. 62/276,055, filed on Jan. 7, 2016.

(51) Int. Cl.
*H04W 40/24* (2009.01)
*H04W 88/02* (2009.01)

(58) Field of Classification Search
CPC ...... H04L 41/04; H04W 84/12; H04W 88/08; H04W 80/04; H04W 88/06; H04W 84/18; H04W 74/08; H04W 8/26; H04W 72/0453; H04W 40/244; H04W 88/02; H04B 1/50; H04B 1/56; H04B 7/2621
USPC ..... 370/310.2, 328, 338, 349, 254, 339, 343
See application file for complete search history.

(56) References Cited

U.S. PATENT DOCUMENTS

| | | | |
|---|---|---|---|
| 2003/0135797 A1 | 7/2003 | Choi | |
| 2015/0139163 A1 | 5/2015 | Cordeiro et al. | |
| 2015/0245275 A1* | 8/2015 | Naka | H04W 40/244 370/310 |
| 2015/0349857 A1 | 12/2015 | Cordeiro et al. | |
| 2016/0164800 A1* | 6/2016 | Eitan | H04L 47/80 370/389 |
| 2017/0070881 A1* | 3/2017 | Sun | H04L 63/08 |
| 2017/0078008 A1* | 3/2017 | Kasher | H04B 7/0617 |
| 2017/0079031 A1 | 3/2017 | Maltsev, Jr. et al. | |
| 2017/0118656 A1* | 4/2017 | Xin | H04W 16/28 |
| 2017/0171773 A1* | 6/2017 | Cariou | H04W 74/0841 |
| 2017/0201992 A1 | 7/2017 | Cordeiro et al. | |
| 2018/0255537 A1 | 9/2018 | Park et al. | |
| 2019/0150154 A1 | 5/2019 | Cordeiro et al. | |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
International Search Report and Written Opinion for PCT/US2016/065084, dated Mar. 13, 2017, 11 pages.
International Preliminary Report on Patentability for PCT/US2016/065084, dated Jul. 19, 2018, 8 pages.
Office Action for U.S. Appl. No. 15/200,022, dated Nov. 22, 2017, 22 pages.
Notice of Allowance for U.S. Appl. No. 15/200,022, dated May 16, 2018, 7 Pages.
Office Action for U.S. Appl. No. 16/250,232, dated Nov. 14, 2019, 29 pages.
Notice of Allowance for U.S. Appl. No. 16/250,232, dated Feb. 4, 2020, 10 Pages.

* cited by examiner

APPARATUS, SYSTEM AND METHOD OF COMMUNICATING AN ENHANCED DIRECTIONAL MULTI GIGABIT (EDMG) SUPPORT INDICATION

CROSS REFERENCE

This Application claims the benefit of and priority from U.S. Provisional Patent Application No. 62/276,055 entitled "APPARATUS, SYSTEM AND METHOD OF COMMUNICATING AN INDICATION OF AN EXTENDED CAPABILITY", filed Jan. 7, 2016, the entire disclosure of which is incorporated herein by reference.

TECHNICAL FIELD

Embodiments described herein generally relate to communicating an Enhanced Directional Multi Gigabit (EDMG) support indication.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

Some Specifications may be configured to support a Single User (SU) system, in which a Station (STA) cannot transmit frames to more than a single STA at a time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
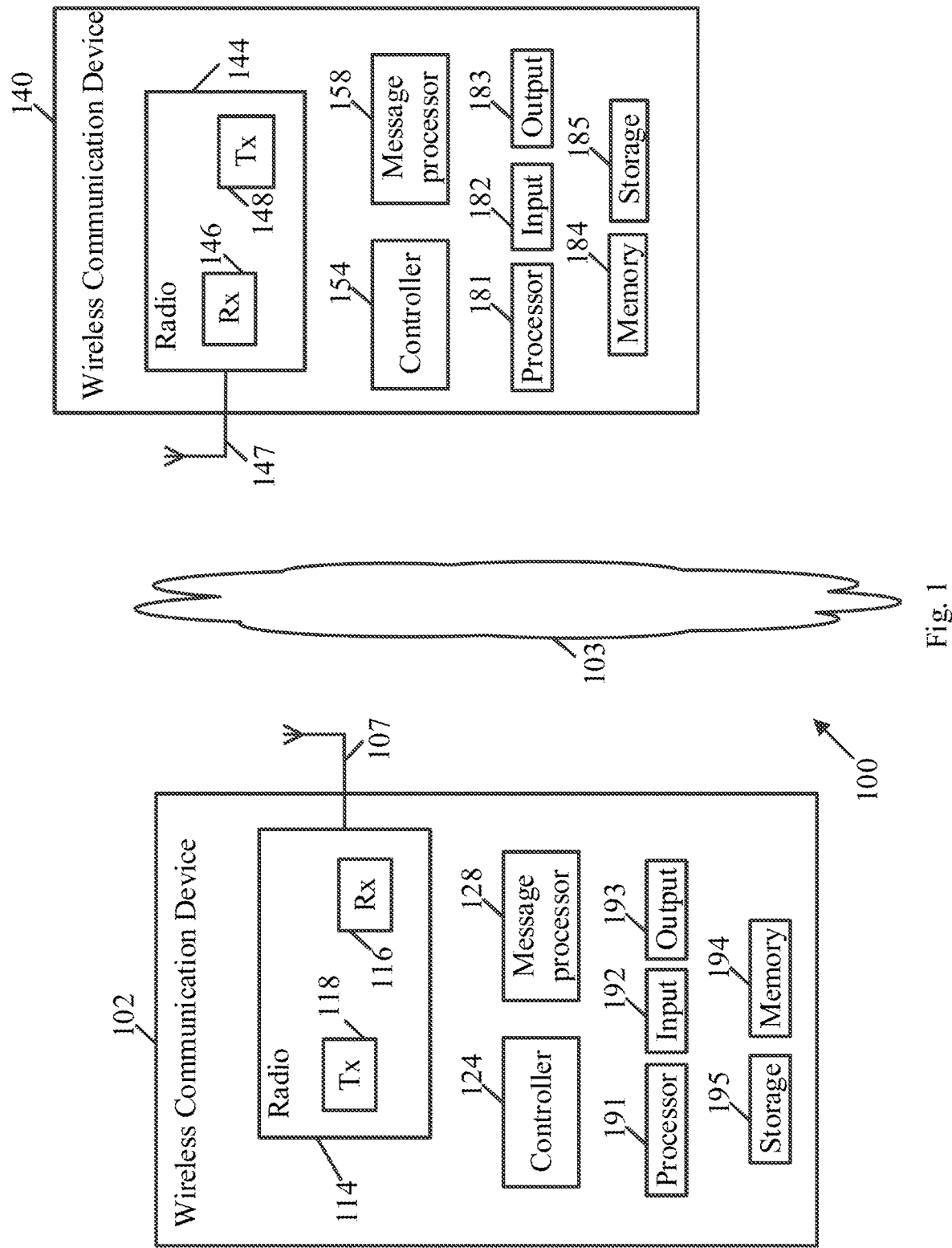
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a sensor device, an Internet of Things (IoT) device, a desktop computer, a mobile computer, a laptop computer, a notebook computer, a tablet computer, a server computer, a handheld computer, a handheld device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE 802.11-2012, *IEEE Stan-* dard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmc™/D6.0, June 2016 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may perform the functionality of any other wireless device and/or station, e.g., a WLAN STA, a WiFi STA, and the like.

In some demonstrative embodiments, device 102 and/or device 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG bands and/or channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, an S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some communications over a wireless communication band, for example, a DMG band or any other band, may be performed over a single channel bandwidth (BW). For example, the IEEE 802.11ad Specification defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel.

Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an IEEE 802.11ad Specification, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may include, operate as, and/or perform the functionality of one or more EDMG STAs. For example, device 102 may include, operate as, and/or perform the functionality of, at least one EDMG STA, and/or device 140 may include, operate as, and/or perform the functionality of, at least one EDMG STA.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, devices 102 and/or 140 may include EDMG STAs capable of communicating in an EDMG BSS. For example, the EDMG BASS may include a BSS, in which a DMG Beacon frame transmitted by an EDMG STA includes an EDMG Capabilities element, e.g., as described below.

In some demonstrative embodiments, devices 102 and/or 140 may be configured to support one or more mechanisms and/or features, for example, channel bonding, single user (SU) MIMO, and/or and multi user (MU) MIMO, for example, in accordance with an IEEE 802.11ay Standard and/or any other standard and/or protocol.

In some demonstrative embodiments, devices 102 and/or 140 may be configured to support the one or more mechanisms and/or features in a backwards compatible manner, e.g., in a manner which may be compatible with one or more devices ("legacy devices"), which may not support these mechanisms and/or features, e.g., one or more non-EDMG stations, for example, stations configured according to an IEEE 802.11ad Standard, and the like.

In one example, a legacy station (STA), for example, a DMG STA, may include, may comply with, and/or may be configured according to, a first specification, for example, an IEEE 802.11ad Specification, while a non-legacy station (STA), for example, an EDMG STA, may include, may comply with, and/or may be configured according to, a second specification, for example, an IEEE 802.11ay Specification, or any other Specification.

In some demonstrative embodiments, devices 102 and/or 140 may be configured to be able to communicate in a deployment, scenario, and/or implementation ("mixed scenario"), which may include both one or more legacy STAs as well as one or more non-legacy STAs, e.g., as described below.

Figure 2:
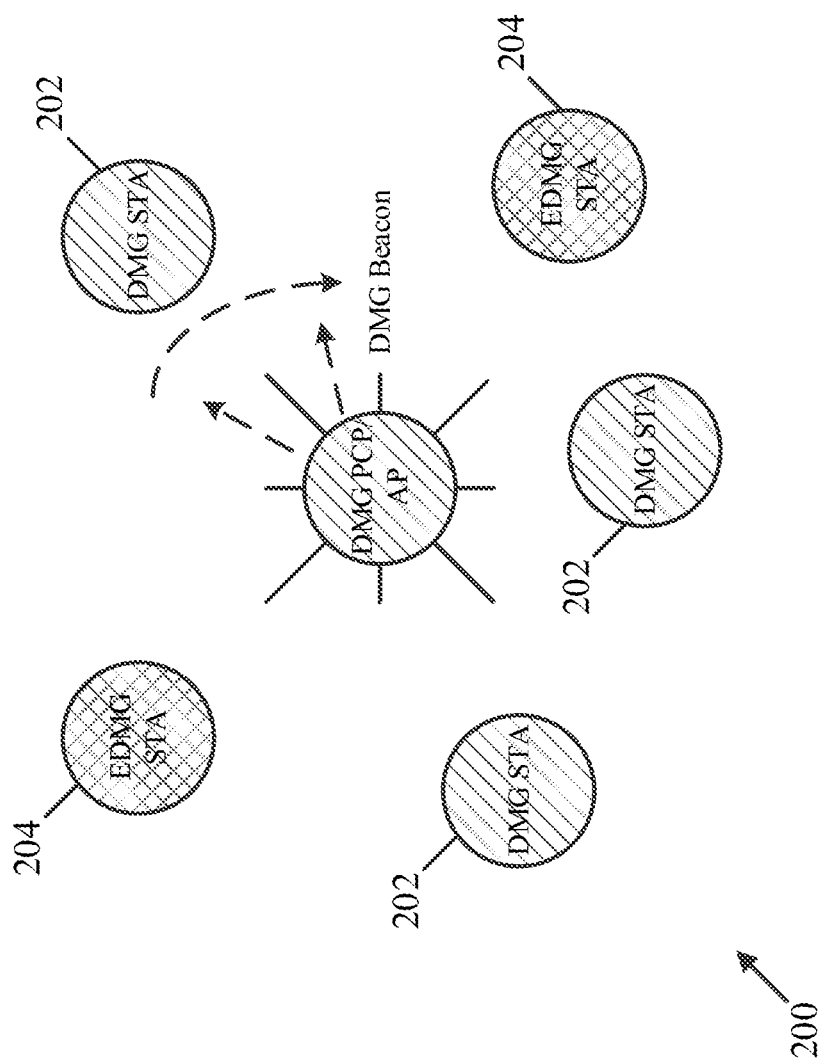
FIG. 2 is a schematic illustration of a Basic Service Set (BSS), in accordance with some demonstrative embodiments.

Reference is made to FIG. 2, which schematically a Basic Service Set (BSS) 200, in accordance with some demonstrative embodiments.

In some demonstrative embodiments, as shown in FIG. 2, BSS 200 may include one or more DMG stations 202, and one or more EDMG stations 204.

In some demonstrative embodiments, devices 102 and/or 140 (FIG. 1) may be configured to operate as, perform the functionality of, and/or perform one or more operations of EDMG STAs 204.

In some demonstrative embodiments, an EDMG STA 204, e.g., a STA implemented by device 102 (FIG. 1) and/or a STA implemented by device 140 (FIG. 1), may be configured to announce an EDMG capability of EDMG STA 204, for example, to enable one or more STAs, e.g., one or more other EDMG STAs 204 in BSS 200, e.g., one or more PCP/AP EDMG STAs and/or one or more non-AP/PCP EDMG STAs, to identify that the EDMG STA 204 has EDMG capabilities and/or to differentiate EDMG STA 204 from the non-EDMG STAs 202.

In some demonstrative embodiments, a first EDMG STA 204 may announce an EDMG capability of the first EDMG STA 204, and/or a second EDMG STA 204 may announce an EDMG capability of the second EDMG STA 204. According to these embodiments, the first EDMG STA 204 may be able to identify that the second EDMG STA 204 is an EDMG STA, and/or the second EDMG STA 204 may be able to identify that the first EDMG STA 204 is an EDMG STA. According to these embodiments, the first EDMG STA 204 may communicate one or more communications with the second EDMG STA 204 according to one or more EDMG communications schemes, e.g., using a channel bonding scheme and/or a MU MIMO scheme, e.g., based on the identifying that that the second EDMG STA 204 is an EDMG STA; and/or the second EDMG STA 204 may communicate one or more communications with the first EDMG STA 204 according to one or more EDMG communications schemes, e.g., using a channel bonding scheme and/or a MU MIMO scheme, e.g., based on the identifying that that the first EDMG STA 204 is an EDMG STA.

In some demonstrative embodiments, it may not be advantageous to define capability information elements (IEs), which may be carried in beacon and probe frames, wherein a presence or absence of the IEs in the frames may indicate the support or lack of support for one or more EDMG features, for example, channel bonding, MU MIMO, and/or one or more additional or alternative features of the EDMG.

For example, such an approach may face one or more challenges, for example, if implemented in a DMG scenario, for example, in a mixed BSS, e.g., BSS 200, including one or more DMG STAs 202.

In one example, it may be optional for a station, which is a PCP/AP STA, to transmit the capability IEs in DMG Beacon frames. For example, a DMG Beacon frame may be transmitted at a low Modulation and Coding Scheme (MCS), e.g., MCS0, and through sector sweeping, which may effectively decrease a net data rate of the beacon frame, e.g., about 1000 times lower, than the data rate. Hence, an addition of the capability IEs in DMG Beacon frames may significantly impact protocol efficiency. Therefore, a product implementation may prefer not to include the capability IEs in DMG Beacon frames.

In another example, it may not be advantageous to include the capability IEs in Probe Request and/or Response frames, for example, since the frames may be exchanged only after beamforming (BF) is performed, e.g., according to an IEEE 802.11ad Specification. Accordingly, a STA would first have to perform the entire BF training procedure before the STA can exchange probe frames with the capability IEs. This may lead to higher power consumption, for example, in cases, when the STA discovers that the peer STA does not support the required EDMG capabilities after performing the BF.

Referring back to FIG. 1, in some demonstrative embodiments, devices 102 and/or 140 may be configured to include an indication of an EDMG capability, for example, an EDMG supported capability attribute, e.g., a 1 bit indication, and/or any indication of one or more additional EDMG capabilities, in compliance with a legacy frame structure, for example, using a legacy frame structure for EDMG Beacon and/or SSW frames, e.g., as described below.

In some demonstrative embodiments, including an EDMG support indication in a frame having a legacy frame structure, may enable to signal the EDMG capability indication in a backwards compatible fashion, e.g., even without requiring a STA to perform BF with an AP/PCP STA to exchange probe frames, and to discover that EDMG is not supported.

In some demonstrative embodiments, communicating the indication of the capability of a STA to support EDMG features according to a legacy frame structure may be advantageous, for example, at least by enabling backwards compatibility, e.g., in an efficient manner, for example, by not requiring an additional overhead in DMG Beacon frames and/or DMG SSW frames, and/or by not requiring STAs to perform BF, e.g., prior to discovering if a STA have EDMG capabilities.

For example, in addition to the defining of an EDMG capability IE, the EDMG support indication may also be signaled in the existing legacy frame structure. Such a solution may obviate a need to require a STA to perform BF and exchange probe frames, e.g., only to discover that the capability is not supported.

In some demonstrative embodiments, at least one EDMG capability field, for example, an EDMG support field ("EDMG Supported field"), e.g., a 1 bit field, may be defined as part of at least one type of frame structure according to a legacy frame structure, e.g., as described below.

In other embodiments, the EDMG capability field may be defined and/or included as part of one or more additional and/or alternative types of legacy frame structures.

In other embodiments, one or more additional or alternative types of EDMG capability fields, e.g., having one bit or any other number of bits, may be defined and/or included in a legacy frame structure, e.g., in addition to or instead of the 1-bit EDMG Supported field.

In some demonstrative embodiments, devices 102 and/or 140 may be configured to communicate an indication of a capability of a STA, e.g., implemented by devices 102 and/or 140, to support EDMG features, e.g., according to an IEEE 802.11ay Specification, as part of a frame having a structure in accordance with a legacy frame structure, e.g., a frame structure according to an IEEE 802.11ad Specification.

In some demonstrative embodiments, a first wireless station implemented by a first device of devices 102 and 140, e.g., a STA implemented by device 102, may be configured to generate a frame having a structure compatible with a DMG frame structure.

In some demonstrative embodiments, the frame may include an EDMG supported field to indicate that the first wireless station, e.g., the STA implemented by device 102, supports one or more EDMG features.

In some demonstrative embodiments, the first wireless station, e.g., the STA implemented by device 102, may be configured to transmit the frame over a DMG channel.

In some demonstrative embodiments, a second wireless station implemented by a second device of devices 102 and 140, e.g., a STA implemented by device 140, may be configured to process the frame having the structure compatible with the DMG frame structure from the first wireless station over the DMG channel.

In some demonstrative embodiments, the second wireless station, e.g., the STA implemented by device 140, may be configured to communicate an EDMG communication with the first wireless station based on the EDMG supported field in the frame, e.g., as described below.

In some demonstrative embodiments, the second wireless station, e.g., the STA implemented by device 140, may be configured to communicate the EDMG communication with the first wireless station, for example, only if the EDMG supported field includes a predefined value, e.g., as described below.

In some demonstrative embodiments, the EDMG supported field may include a 1-bit indication.

In some demonstrative embodiments, the EDMG supported field may include a bit value of 1, e.g., as the predefined value.

In some demonstrative embodiments, the first wireless station, e.g., the STA implemented by device 102, may be configured to set the EDMG supported field to 1, for example, to indicate that the first wireless station supports the one or more EDMG features.

In some demonstrative embodiments, the second wireless station, e.g., the STA implemented by device 140, may be configured to communicate the EDMG communication with the first wireless station, for example, only if the EDMG supported field indicates the first wireless station supports one or more EDMG features.

In some demonstrative embodiments, an EDMG wireless station, e.g., the STA implemented by device 140 and/or the STA implemented by device 102, may be configured to select not to communicate an EDMG communication with a peer wireless station, e.g., a DMG STA 202 (FIG. 2), for example, if a frame from the peer wireless station does not include the EDMG supported field to indicate the peer wireless station supports one or more EDMG features. For example, the EDMG wireless station, e.g., the STA implemented by device 140 and/or the STA implemented by device 102, may select not to communicate an EDMG communication with the peer wireless station, for example, if a frame from the peer wireless station does not include the EDMG supported field with the bit value of 1.

In some demonstrative embodiments, some types of frames may be configured to signal the EDMG capability, for example, to address signaling the EDMG capability from a downlink perspective, e.g., to allow a PCP/AP STA to indicate an EDMG capability of the PCP/AP STA, e.g., to a non-PCP/non-AP STA.

In some demonstrative embodiments, the frame including the EDMG support indication may include a beacon frame.

In some demonstrative embodiments, device 102 may include, operate as, perform the role of, and/or perform the functionality of, a PCP/AP STA.

In some demonstrative embodiments, device 140 may include, operate as, perform the role of, and/or perform the functionality of, a non-PCP/AP STA.

In some demonstrative embodiments, device 102 may be configured to generate and transmit the beacon frame to be received by one or more wireless stations, e.g., including the STA implemented by device 140, e.g., as described below.

In some demonstrative embodiments, controller 124 may be configured to control, cause and/or trigger device 102 to generate the beacon frame having the structure compatible with the DMG frame structure.

In some demonstrative embodiments, the beacon frame may include the EDMG supported field to indicate that the STA implemented by device 102 supports the one or more EDMG features.

In some demonstrative embodiments, controller 124 may be configured to control, cause and/or trigger device 102 and/or transmitter 118 to transmit the beacon frame over a DMG channel.

In some demonstrative embodiments, the beacon frame may include a DMG parameters field including the EDMG supported field, for example, according to a first option.

In some demonstrative embodiments, the EDMG supported field may include a reserved bit of the DMG parameters field, e.g., according to the first option.

In some demonstrative embodiments, an EDMG Supported field shall be defined by using one reserved bit from the DMG Parameters field.

In some demonstrative embodiments, an EDMG STA, e.g., an EDMG STA implemented by device 102 and/or an EDMG STA implemented by device 140, shall set the EDMG Supported field to 1.

In some demonstrative embodiments, the beacon frame may include a beacon interval control field including the EDMG supported field, e.g., according to a second option.

In some demonstrative embodiments, controller 124 may be configured to control, cause and/or trigger device 102 to set the EDMG supported field to 1, for example, to indicate that the STA implemented by device 102 supports the one or more EDMG features.

In some demonstrative embodiments, device 140 may be configured to receive and process the beacon frame from device 102, e.g., as described below.

In some demonstrative embodiments, controller 154 may be configured to control, cause and/or trigger device 140 and/or receiver 146 to process the beacon frame from device 102, e.g., over the DMG channel.

In some demonstrative embodiments, controller 154 may be configured to control, cause and/or trigger device 140 and/or radio 144 to communicate the EDMG communication with device 102, for example, based on the EDMG supported field in the beacon frame.

In one example, controller 154 may be configured to control, cause and/or trigger device 140 and/or radio 144 to communicate the EDMG communication with device 102, for example, only if the reserved bit of the DMG parameters field of the beacon frame includes the predefined value, e.g., the bit value of 1, to indicate that the STA implemented by device 102 supports the one or more EDMG features, for example, as described below with reference to FIG. 3.

In another example, controller 154 may be configured to control, cause and/or trigger device 140 and/or radio 144 to communicate the EDMG communication with device 102, for example, only if the beacon interval control field of the beacon frame includes the EDMG supported field indicating that the STA implemented by device 102 supports the one or more EDMG features, for example, as described below with reference to FIG. 4.

Figure 3:
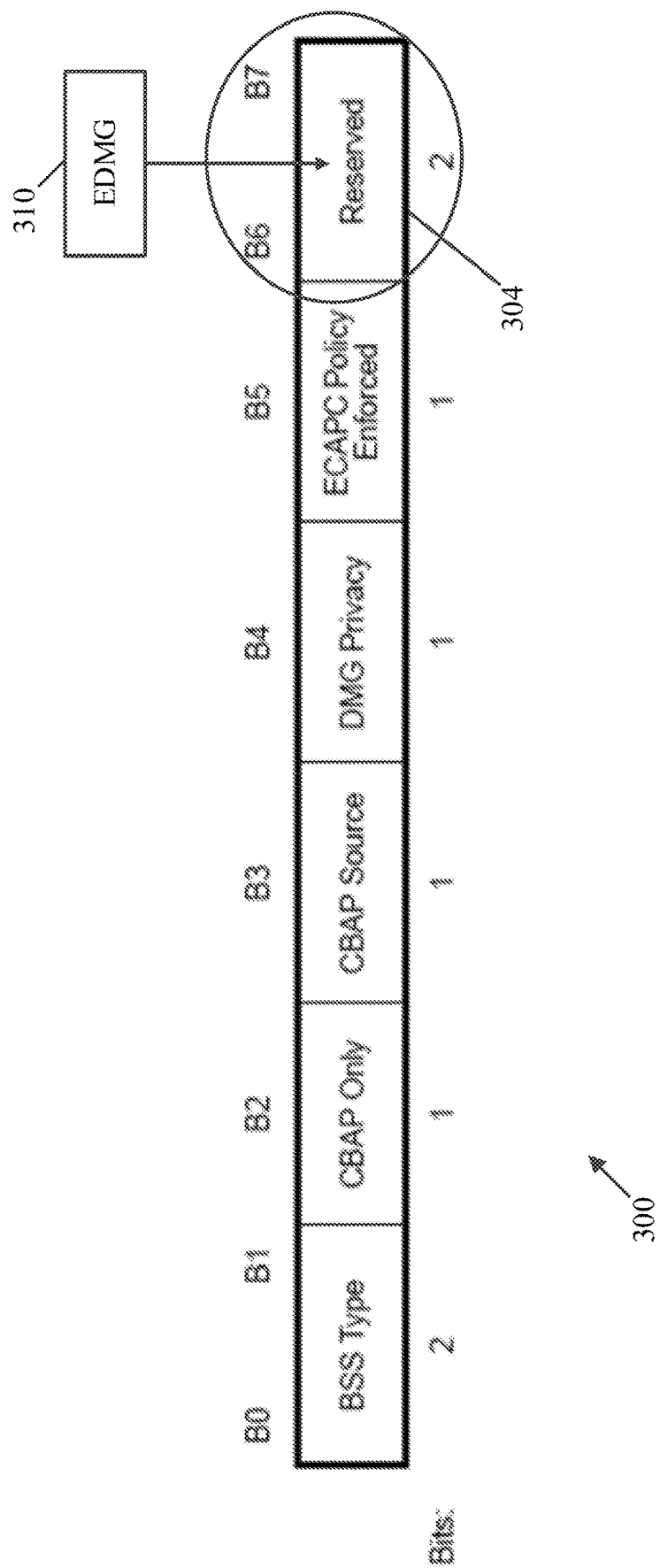
FIG. 3 is a schematic illustration of a DMG parameters field, in accordance with some demonstrative embodiments.

Reference is made to FIG. 3, which schematically illustrates a DMG parameters field 300 of a beacon frame, in accordance with some demonstrative embodiments.

In some demonstrative embodiments, as shown in FIG. 3, DMG parameters field 300 may include an EDMG supported field 310, for example, in a reserved portion 304 of the DMG parameters field 300.

In some demonstrative embodiments, the EDMG supported field 310 may be included in the DMG Parameters field 300, which may be structured to be included, for example, in legacy DMG Beacon frames.

In some demonstrative embodiments, as shown in FIG. 3, the EDMG supported field 310 may be included in DMG Parameters field 300, for example, by reusing a reserved bit in reserved portion 304.

In some demonstrative embodiments, one or more additional or alternative types of EDMG capability fields, e.g., having one bit or any other number of bits, may be defined and/or included in a legacy frame structure of a DMG parameters field, e.g., in addition to or instead of EDMG supported field 310.

In one example, controller 124 (FIG. 1) may be configured to control, trigger and/or cause a wireless station implemented by device 102 (FIG. 1) to transmit a beacon frame including EDMG supported field 310 in DMG Parameters field 300 set to 1, for example, to indicate that the wireless station implemented by device 102 supports the one or more EDMG features.

Figure 4:
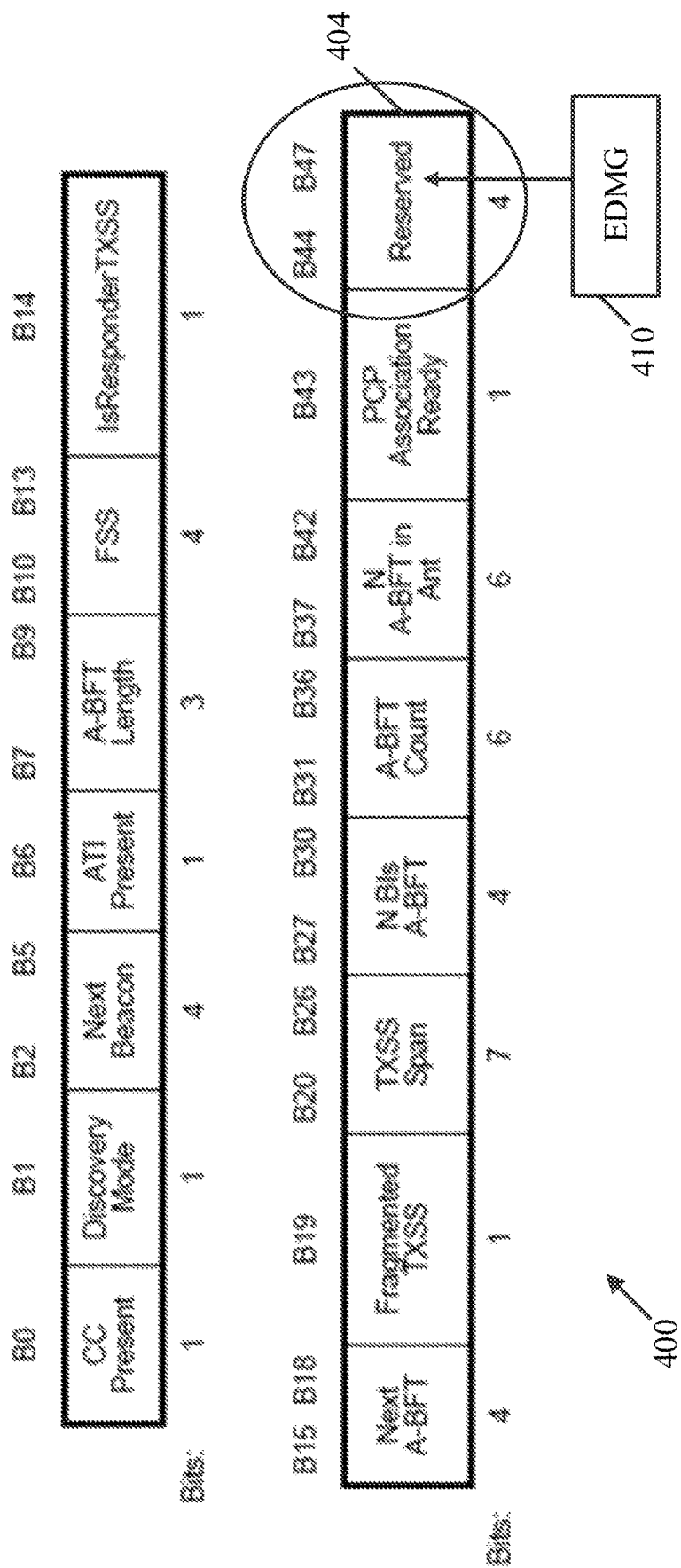
FIG. 4 is a schematic illustration of a beacon interval control field, in accordance with some demonstrative embodiments.

Reference is made to FIG. 4, which schematically illustrates a beacon interval control field 400 of a beacon frame, in accordance with some demonstrative embodiments.

In some demonstrative embodiments, as shown in FIG. 4, beacon interval control field 400 may include an EDMG supported field 410, for example, in a reserved portion 404 of the DMG parameters field 400.

In some demonstrative embodiments, the EDMG supported field 410 may be included in the beacon interval control field 400, which may be structured to be included, for example, in legacy DMG Beacon frames.

In some demonstrative embodiments, as shown in FIG. 4, the EDMG supported field 410 may be included in beacon interval control field 400, for example, by reusing a reserved bit in reserved portion 404.

In some demonstrative embodiments, one or more additional or alternative types of EDMG capability fields, e.g., having one bit or any other number of bits, may be defined and/or included in a legacy frame structure of a beacon interval control field, e.g., in addition to or instead of EDMG supported field 410.

In one example, controller 124 (FIG. 1) may be configured to control, trigger and/or cause a wireless station implemented by device 102 (FIG. 1) to transmit a beacon frame including EDMG supported field 410 in beacon interval control field 400 set to 1, for example, to indicate that the wireless station implemented by device 102 supports the one or more EDMG features.

In some demonstrative embodiments, some types of frames may be configured to signal the EDMG capability, for example, to address signaling the EDMG capability from an uplink perspective, e.g., to allow a non-PCP/non-AP STA to indicate an EDMG capability of the non-PCP/non-AP STA, e.g., to a PCP/AP STA. For example, the non-PCP/non-AP STA may respond to a DMG Beacon from the PCP/AP STA by transmitting a SSW frame, and the PCP/AP STA may be able to find out whether the non-PCP/non-AP STA supports the EDMG features, e.g., as soon as the non-PCP/non-AP STA responds to the DMG beacon with the SSW frame.

In some demonstrative embodiments, the frame including the EDMG support indication may include a Sector Sweep (SSW) frame.

In some demonstrative embodiments, the SSW frame may be transmitted, for example, by a non-PCP/AP STA, e.g., in response to a beacon frame from a PCP/AP STA.

In some demonstrative embodiments, a STA implemented by device 140 may be configured to send the SSW frame to a STA implemented by device 102, for example, in response to a beacon frame from the STA implemented by device 102.

In some demonstrative embodiments, controller 154 may be configured to control, cause and/or trigger the STA implemented by device 140 to generate the SSW frame having the structure compatible with a DMG frame structure.

In some demonstrative embodiments, the SSW frame may include the EDMG supported field to indicate that STA implemented by device 140 supports one or more EDMG features.

In some demonstrative embodiments, controller 154 may be configured to control, cause and/or trigger the STA implemented by device 140 to set the EDMG supported field to 1, for example, to indicate that the STA implemented by device 140 supports the one or more EDMG features.

In some demonstrative embodiments, controller 154 may be configured to control, cause and/or trigger the STA implemented by device 140 and/or transmitter 148 to transmit the SSW frame over a DMG channel.

In some demonstrative embodiments, the SSW frame may include an SSW feedback field including the EDMG supported field.

In some demonstrative embodiments, the EDMG supported field may include a reserved bit of the SSW feedback field.

In some demonstrative embodiments, the STA implemented by device 102 may be configured to receive and process the SSW frame from device 140, e.g., as described below.

In some demonstrative embodiments, controller 124 may be configured to control, cause and/or trigger the STA implemented by device 102 and/or receiver 146 to process the SSW frame from device 140, e.g., over the DMG channel.

In some demonstrative embodiments, controller 124 may be configured to control, cause and/or trigger the STA implemented by device 102 and/or radio 114 to communicate an EDMG communication with the STA implemented by device 1140, for example, based on the EDMG supported field in the SSW feedback field in the SSW frame.

In one example, controller 124 may be configured to control, cause and/or trigger the STA implemented by device 102 and/or radio 114 to communicate the EDMG communication with the STA implemented by device 140, for example, only if the reserved bit of the DMG parameters field of the SSW field indicates that the STA implemented by device 140 supports the one or more EDMG features.

Figure 5:
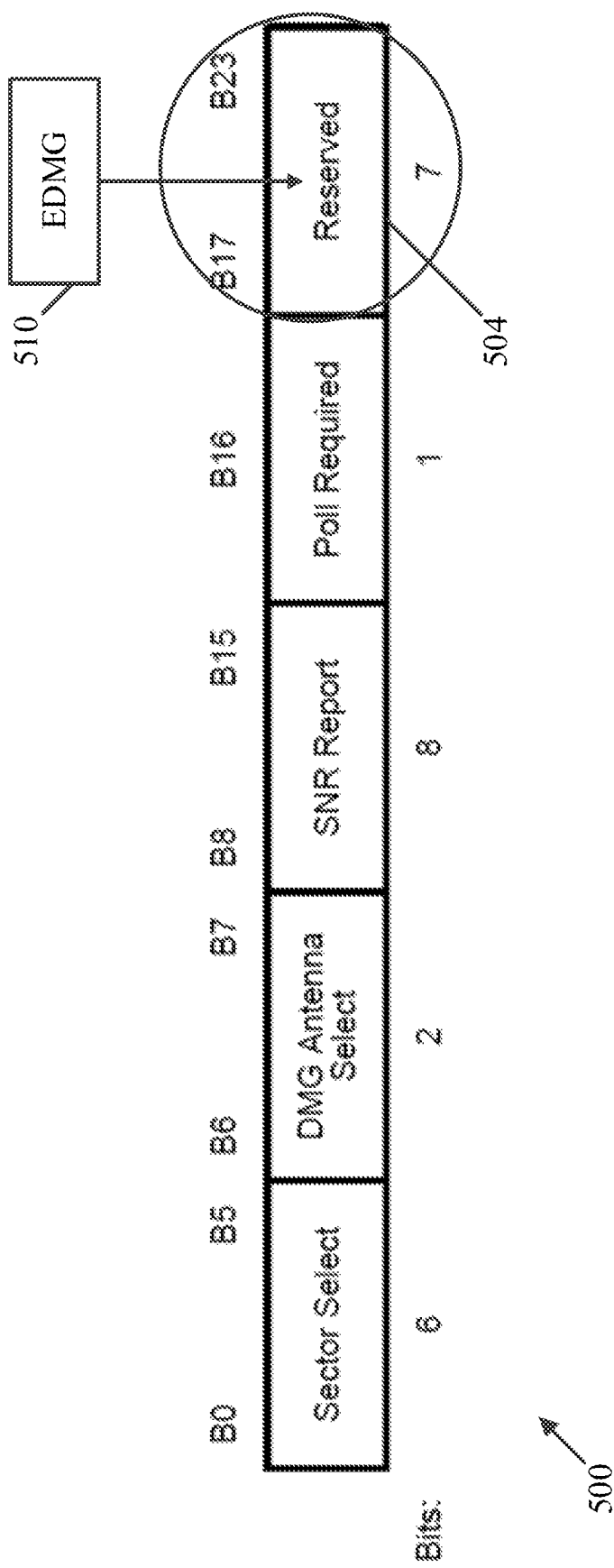
FIG. 5 is a schematic illustration of a Sector Sweep (SSW) feedback field, in accordance with some demonstrative embodiments.

Reference is made to FIG. 5, which schematically illustrates an SSW feedback field 500 of an SSW frame, in accordance with some demonstrative embodiments.

In some demonstrative embodiments, as shown in FIG. 5, SSW feedback field 500 may include an EDMG supported field 510, for example, in a reserved portion 504 of the SSW feedback field 500.

In some demonstrative embodiments, the EDMG supported field 510 may be included in the SSW feedback field 500, which may be structured to be carried, for example, in legacy SSW feedback frames.

In some demonstrative embodiments, as shown in FIG. 5, the EDMG supported field 510 may be included in SSW feedback field 500, for example, by reusing a reserved bit in reserved portion 504.

In one example, controller 154 (FIG. 1) may be configured to control, trigger and/or cause a wireless station implemented by device 140 (FIG. 1) to transmit to the STA implemented by device 102 (FIG. 1) the SSW frame including EDMG supported field 510 in SSW feedback field 500, for example, to indicate that the STA implemented by device 140 (FIG. 1) supports the one or more EDMG features.

In some demonstrative embodiments, one or more additional or alternative types of EDMG capability fields, e.g., having one bit or any other number of bits, may be defined and/or included in a legacy frame structure of a SSW frame, e.g., in addition to or instead of EDMG supported field 510.

Referring back to FIG. 1, In some demonstrative embodiments, a first EDMG STA, for example, a first STA implemented by a first device of devices 102 and/or 140, may be configured to generate and transmit a frame, for example, a frame compatible with a legacy frame structure, including a field, e.g., DMG parameters field 300 (FIG. 3), beacon interval control field 400 (FIG. 4), SSW feedback field 500, and/or any other field, including an EDMG supported field, e.g., EDMG supported field 310 (FIG. 3), EDMG supported field 410 (FIG. 4), EDMG supported field 510 (FIG. 5), and/or any other EDMG supported field, set to indicate that the first EDMG STA supports EDMG features.

In some demonstrative embodiments, a second EDMG STA, for example, a second STA implemented by a second device of devices 102 and/or 140, may be configured to process the frame compatible with the legacy frame structure including the field including the EDMG supported field to indicate that the first EDMG STA, from which the frame is received, supports one or more EDMG features.

In one example, an EDMG STA may receive a frame, e.g., a beacon frame, from a PCP/AP STA. According to this example, the EDMG STA receiving the frame may be able to determine, e.g., to quickly determine, whether the PCP/AP STA supports EDMG features. The EDMG STA may be configured to make a decision as to whether to proceed and perform BF with the PCP/AP STA. For example, if the EDMG STA determines that EDMG features are not supported by the PCP/AP STA, the EDMG STA may decide not to join a BSS of the PCP/AP STA, for example, even before performing BF with the PCP/AP STA. Such an implementation may be advantageous, for example, at least by enabling reduced power consumption, and/or improving the system efficiency, e.g., since there is no need to perform BF with the PCP/AP STA.

In some demonstrative embodiments, devices 102 and/or 140 may be configured to communicate an indication of an EDMG capability of a wireless station as part of an EDMG capability element, for example, an EDMG capability information element (IE), e.g., as described below.

In some demonstrative embodiments, the EDMG supported field may be implemented as part of, and/or indicated or represented by, one or more fields of the EDMG capability element, e.g., as descried below.

In some demonstrative embodiments, devices 102 and/or 140 may be configured to generate, process, and/or communicate a frame, e.g., a beacon frame, including the EDMG capability element.

In some demonstrative embodiments, device 102 may be configured to generate and transmit the beacon frame to be received by one or more wireless stations, e.g., including the STA implemented by device 140, e.g., as described below.

In some demonstrative embodiments, controller 124 may be configured to control, cause and/or trigger device 102 to generate the beacon frame having the structure compatible with the DMG frame structure.

In some demonstrative embodiments, the beacon frame may include the EDMG capability element to indicate that the STA implemented by device 102 supports the one or more EDMG features.

In some demonstrative embodiments, controller 124 may be configured to control, cause and/or trigger device 102 and/or transmitter 118 to transmit the beacon frame over a DMG channel.

In some demonstrative embodiments, the EDMG capability element may include a STA type field including the EDMG supported field, e.g., to indicate that the wireless station implemented by device 102 supports the one or more EDMG features.

In some demonstrative embodiments, the STA type field may include a three-bit field, or may include any other number of bits.

In some demonstrative embodiments, the STA type field may include a value, e.g., a value of zero or any other predefined value, to indicate that the wireless station transmitting the EDMG capability element supports one or more EDMG features.

In some demonstrative embodiments, one or more other values of the STA type field, e.g., values other than zero, may be reserved, for example, to indicate future types of STAs, e.g., other than EDMG STAs, for example, to enable to define new types of capabilities for the future types of STAs.

In some demonstrative embodiments, the EDMG capability element may include a STA dependent capabilities field, e.g., to indicate the one or more EDMG capabilities of the wireless station.

In some demonstrative embodiments, the STA dependent capabilities field may include a hash value, e.g., as described below.

In some demonstrative embodiments, a hash function may be used to generate the hash value, which may indicate the one or more EDMG capabilities of the wireless station, for example, even without requiring to substantially increase in a size of the of the EDMG capability element, e.g., to allow to keep the size of the EDMG capability element to a minimum.

In some demonstrative embodiments, the hash value may be based on an EDMG capabilities element and a DMG capabilities element, e.g., as described below.

In some demonstrative embodiments, the EDMG capabilities element may represent the one or more EDMG capabilities of the wireless station transmitting the EDMG capabilities element.

In some demonstrative embodiments, the DMG capabilities element may represent one or more DMG capabilities of the wireless station wireless station transmitting the EDMG capabilities element, e.g., in accordance with an IEEE 802.11ad Specification.

In some demonstrative embodiments, the EDMG capability element may include a compressed EDMG capability element having a size of 4 octets.

In one example, the compressed EDMG Capability element may be configured to have a smallest possible size, e.g., of 4 octets or any other size, which may still be included in DMG Beacon frames, e.g., according to a DMG beacon format.

Figure 6:
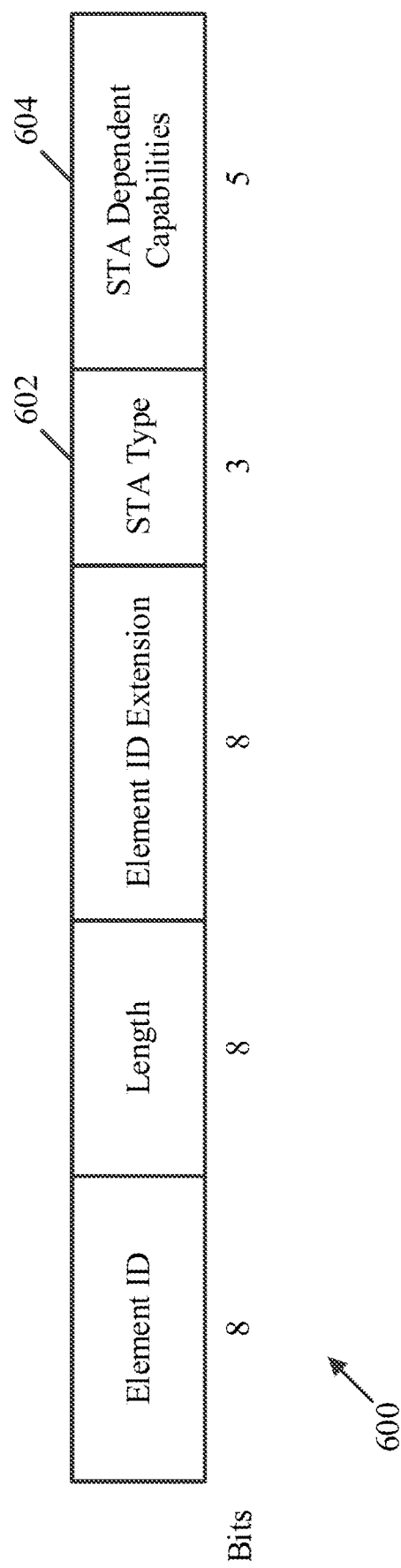
FIG. 6 is a schematic illustration of an Enhanced Directional Multi Gigabit (EDMG) capability element, in accordance with some demonstrative embodiments.

Reference is made to FIG. 6, which schematically illustrates an EDMG capability element 600, in accordance with some demonstrative embodiments.

In some demonstrative embodiments, EDMG capability element 600 may be structured and/or formatted in a manner to allow to include EDMG capability element 600, for example, even in legacy DMG frames, e.g., in legacy DMG Beacon frames.

In some demonstrative embodiments, EDMG capability element 600 may include an EDMG compressed capability element, which may have a compressed and/or reduced size, e.g., as described below.

In some demonstrative embodiments, EDMG capability element 600 may have a compressed and/or reduced size, which may be configured based on a smallest possible size, e.g., which may still be compatible, for example, with a format of a DMG frame, e.g., a DMG beacon frame, e.g., in accordance with an IEEE 802.11ad Specification.

In some demonstrative embodiments, as shown in FIG. 6, EDMG capability element 600 may have a size of 4 octets. In other embodiments, EDMG capability element 600 may have any other size.

In some demonstrative embodiments, as shown in FIG. 6, EDMG capability element 600 may include a STA type field 602, e.g., having a size of three bits or any other size.

In some demonstrative embodiments, STA type field 602 may include, indicate and/or represent the EDMG supported field.

In some demonstrative embodiments, STA type field 602 may be set to indicate a type of a STA transmitting the EDMG capability element 600. For example, STA type field 602 may be set to a predefined value, e.g., zero, for example, to indicate that the STA transmitting the EDMG capability element 600 is an EDMG STA.

In some demonstrative embodiments, one or more values may be reserved, or may be allocated for STA type field 602, e.g., to indicate one or more additional or alternative types of STAs.

In some demonstrative embodiments, as shown in FIG. 6, EDMG capability element 600 may include a STA dependent capabilities field 604, e.g., having a size of five bits or any other size.

In some demonstrative embodiments, STA dependent capabilities field 604 may indicate the one or more EDMG capabilities of a wireless station transmitting the EDMG capability element 600.

In some demonstrative embodiments, STA dependent capabilities field 604 may be configured to indicate a combination of the one or more EDMG capabilities of a wireless station transmitting the EDMG capability element 600 and one or more DMG capabilities of the wireless station transmitting the EDMG capability element 600, e.g., as described below.

In some demonstrative embodiments, STA dependent capabilities field 604 may include a hash function of one or more capabilities, e.g., one or more key capabilities, of the STA transmitting EDMG capability element 600.

In some demonstrative embodiments, STA dependent capabilities field 604 may utilize a hash value, for example, to allow maintaining a reduced size of EDMG capability element 600.

In some demonstrative embodiments, STA dependent capabilities field 604 may include a hash value, which may be generated, for example, using a DMG capabilities element and an EDMG capabilities element corresponding to the STA transmitting EDMG capability element 600, e.g., as described below.

In one example, controller 124 (FIG. 1) may be configured to control, trigger and/or cause a wireless station implemented by device 102 (FIG. 1) to transmit a frame, e.g., a beacon frame, including the STA type field 602 in EDMG capability element 600 set to zero, for example, to indicate that the wireless station implemented by device 102 (FIG. 1) supports the one or more EDMG features; and the STA dependent capabilities field 604 including the hash value, which is based on the EDMG capabilities element and the DMG capabilities element of the station implemented by device 102 (FIG. 1).

Figure 7:
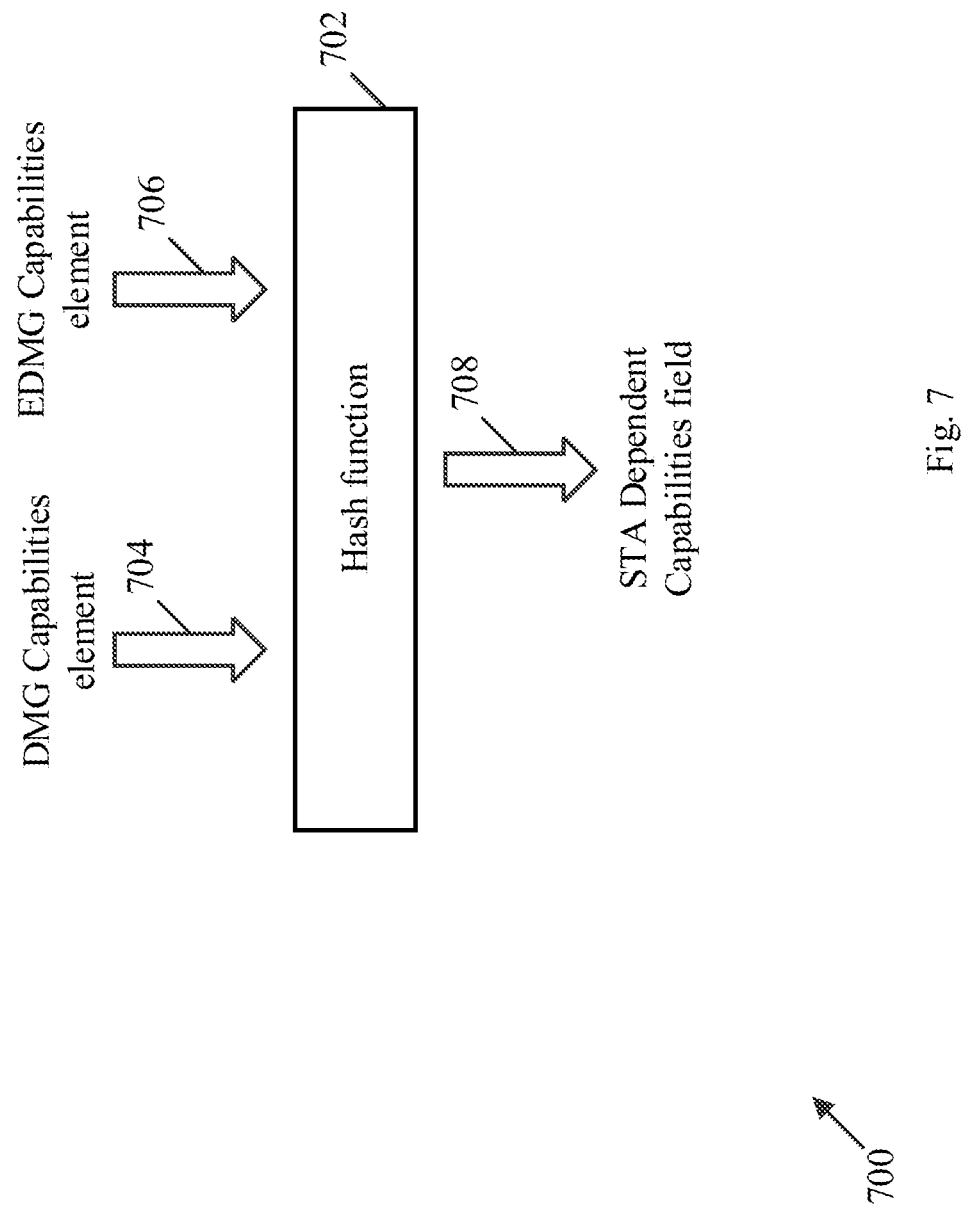
FIG. 7 is a schematic illustration of a hash function configured to generate a hash value of EDMG capabilities and Directional Multi Gigabit (DMG) capabilities, in accordance with some demonstrative embodiments.

Reference is made to FIG. 7, which schematically illustrates a hash function configured to generate a hash value of EDMG capabilities and DMG capabilities of a STA, in accordance with some demonstrative embodiments.

In some demonstrative embodiments, the hash value may be based on the EDMG capabilities element and the DMG capabilities element of an EDMG STA, e.g., as described above.

In some demonstrative embodiments, as shown in FIG. 7, a hash function module 702 may receive a first input 704 including the DMG capabilities element, and a second input 706 including the EDMG capabilities element.

In one example, input 704 may include values representing one or more DMG capabilities of the wireless station and/or input 706 may include values representing one or more EDMG capabilities of the wireless station, for example, a MIMO capability of the wireless station, a DL MU-MIMO capability of the wireless station, a Channel bonding capability of the wireless station, a Short sector sweep capability of the wireless station, a Supported MCS set of the wireless station, and/or any other additional or alternative capability and/or parameter of the wireless station.

In some demonstrative embodiments, as shown in FIG. 7, hash function module 702 may output a hash value 708, e.g., to be included in the STA dependent capabilities field 604 (FIG. 6).

In some demonstrative embodiments, using hash function module 702 and inputs 704 and 706 may enable to define and/or enhance one or more future capabilities, for example, without modifying the STA dependent capabilities field 604 (FIG. 6).

Figure 8:
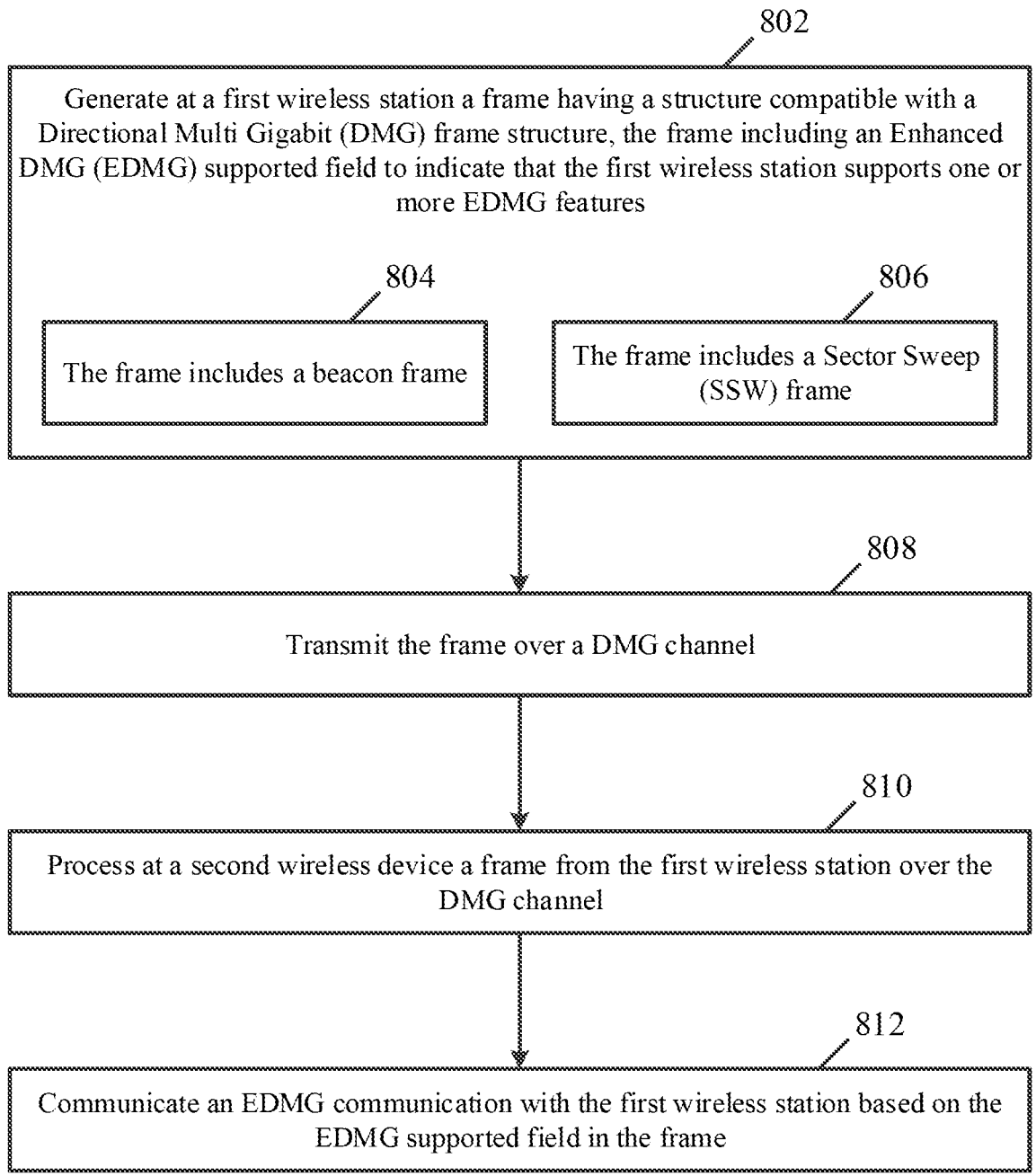
FIG. 8 is a schematic flow-chart illustration of a method of communicating an EDMG support indication, in accordance with some demonstrative embodiments.

Reference is made to FIG. 8, which schematically illustrates a method of communicating an EDMG support indication, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), device 140 (FIG. 1), and/or EDMG STA 204 (FIG. 2); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG.

1), and/or receiver 146 (FIG. 1); and/or a message processor, e.g., message processor 128 (FIG. 1), and/or message processor 158 (FIG. 1).

As indicated at block 802, the method may include generating at a first wireless station a frame having a structure compatible with a DMG frame structure, the frame including an EDMG supported field to indicate that the first wireless station supports one or more EDMG features. For example, device 102 (FIG. 1) and/or device 140 (FIG. 1) may generate a frame having a structure compatible with a DMG frame structure, and including the EDMG supported field, e.g., as described above.

As indicated at block 804, generating the frame may include generating a beacon frame having the structure compatible with the DMG frame structure, and including the EDMG supported field. For example, controller 124 (FIG. 1) may be configured to control, cause and/or trigger device 102 (FIG. 1) to generate the beacon frame including EDMG supported field 310 (FIG. 3), or EDMG supported field 410 (FIG. 4), e.g., as described above.

As indicated at block 806, generating the frame may include generating an SSW frame having the structure compatible with the DMG frame structure, and including the EDMG supported field. For example, controller 154 (FIG. 1) may be configured to control, cause and/or trigger device 140 (FIG. 1) to generate an SSW frame including EDMG supported field 510 (FIG. 5), e.g., as described above.

As indicated at block 808, the method may include transmitting the frame over a DMG channel. For example, controller 124 (FIG. 1) may be configured to control, cause and/or trigger device 102 (FIG. 1) to transmit the beacon frame over the DMG channel; and/or controller 154 (FIG. 1) may be configured to control, cause and/or trigger device 140 (FIG. 1) to transmit the SSW frame to device 102 (FIG. 1) over the DMG channel, e.g., as described above.

As indicated at block 810, the method may include processing the frame at a second wireless station. For example, controller 154 (FIG. 1) may be configured to control, cause and/or trigger device 140 (FIG. 1) to process the beacon frame from device 102 (FIG. 1); and/or controller 124 (FIG. 1) may be configured to control, cause and/or trigger device 102 (FIG. 1) to process the SSW frame from device 140 (FIG. 1), e.g., as described above.

As indicated at block 812, the method may include communicating an EDMG communication with the first wireless station based on the EDMG supported field in the frame. For example, controller 154 (FIG. 1) may be configured to control, cause and/or trigger device 140 (FIG. 1) to communicate an EDMG communication with device 102 (FIG. 1), for example, based on the beacon frame from device 102 (FIG. 1); and/or controller 124 (FIG. 1) may be configured to control, cause and/or trigger device 102 (FIG. 1) to communicate an EDMG communication with device 140 (FIG. 1), for example, based on the SSW frame from device 140 (FIG. 1), e.g., as described above.

Figure 9:
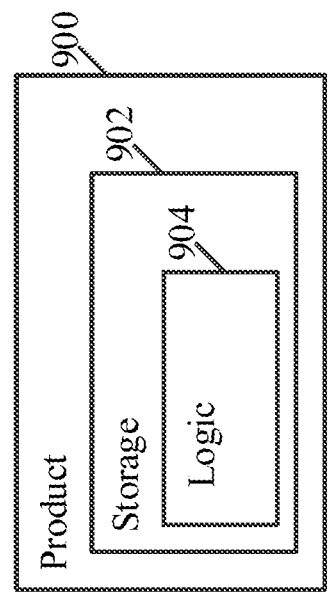
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), EDMG STA 204 (FIG. 2), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities as described above with reference to FIGS. 1, 2, 3, 4, 5, 6, 7 and/or 8, and/or one or more operations described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, C#, Java, Python, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to generate a frame having a structure compatible with a Directional Multi Gigabit (DMG) frame structure, the frame comprising an Enhanced DMG (EDMG) supported field to indicate that the wireless station supports one or more EDMG features; and transmit the frame over a DMG channel.

Example 2 includes the subject matter of Example 1, and optionally, wherein the frame comprises a beacon frame.

Example 3 includes the subject matter of Example 2, and optionally, wherein the beacon frame comprises a DMG parameters field comprising the EDMG supported field.

Example 4 includes the subject matter of Example 3, and optionally, wherein the EDMG supported field comprises a reserved bit of the DMG parameters field.

Example 5 includes the subject matter of Example 4, and optionally, wherein the apparatus is configured to cause the wireless station to set the EDMG supported field to 1.

Example 6 includes the subject matter of Example 2, and optionally, wherein the beacon frame comprises a beacon interval control field comprising the EDMG supported field.

Example 7 includes the subject matter of any one of Examples 2-6, and optionally, wherein the wireless station comprises a Personal Basic Service Set (PBSS) Control Point (PCP) or Access Point (AP) (PCP/AP) station STA.

Example 8 includes the subject matter of Example 1, and optionally, wherein the frame comprises a Sector Sweep (SSW) frame.

Example 9 includes the subject matter of Example 8, and optionally, wherein the SSW frame comprises an SSW feedback field comprising the EDMG supported field.

Example 10 includes the subject matter of Example 9, and optionally, wherein the EDMG supported field comprises a reserved bit of the SSW feedback field.

Example 11 includes the subject matter of any one of Examples 8-10, and optionally, wherein the wireless station comprises a non Personal Basic Service Set (PBSS) Control Point (PCP) or Access Point (AP) (non-PCP/AP) station (STA).

Example 12 includes the subject matter of any one of Examples 8-11, and optionally, wherein the apparatus is configured to cause the wireless station to transmit the SSW frame in response to a beacon frame from a Personal Basic Service Set (PBSS) Control Point (PCP) or Access Point (AP) (PCP/AP) station (STA).

Example 13 includes the subject matter of any one of Examples 1-12, and optionally, wherein the EDMG supported field comprises a 1-bit field.

Example 14 includes the subject matter of any one of Examples 1-13, and optionally, wherein the apparatus is configured to cause the wireless station to set the EDMG supported field to 1.

Example 15 includes the subject matter of Example 1, and optionally, wherein the frame comprises an EDMG capability element comprising a station (STA) type field comprising the EDMG supported field.

Example 16 includes the subject matter of Example 15, and optionally, wherein the STA type field comprises a three-bit field.

Example 17 includes the subject matter of Example 15 or 16, and optionally, wherein the STA type field comprises a value of zero to indicate that the wireless station supports one or more EDMG features.

Example 18 includes the subject matter of any one of Examples 15-17, and optionally, wherein the EDMG capability element comprises a STA dependent capabilities field to indicate one or more EDMG capabilities of the wireless station.

Example 19 includes the subject matter of Example 18, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 20 includes the subject matter of any one of Examples 15-17, and optionally, wherein the EDMG capability element comprises a compressed EDMG capability element having a size of 4 octets.

Example 21 includes the subject matter of any one of Examples 1-20, and optionally, comprising a radio to transmit the frame over the DMG channel.

Example 22 includes the subject matter of any one of Examples 1-21, and optionally, comprising one or more directional antennas, a memory, and a processor.

Example 23 includes a system of wireless communication comprising a wireless station, the wireless station comprising one or more directional antennas; a radio; a memory; a processor; and a controller configured to cause the wireless station to generate a frame having a structure compatible with a Directional Multi Gigabit (DMG) frame structure, the frame comprising an Enhanced DMG (EDMG) supported field to indicate that the wireless station supports one or more EDMG features; and transmit the frame over a DMG channel.

Example 24 includes the subject matter of Example 23, and optionally, wherein the frame comprises a beacon frame.

Example 25 includes the subject matter of Example 24, and optionally, wherein the beacon frame comprises a DMG parameters field comprising the EDMG supported field.

Example 26 includes the subject matter of Example 25, and optionally, wherein the EDMG supported field comprises a reserved bit of the DMG parameters field.

Example 27 includes the subject matter of Example 26, and optionally, wherein the controller is configured to cause the wireless station to set the EDMG supported field to 1.

Example 28 includes the subject matter of Example 24, and optionally, wherein the beacon frame comprises a beacon interval control field comprising the EDMG supported field.

Example 29 includes the subject matter of any one of Examples 24-28, and optionally, wherein the wireless station comprises a Personal Basic Service Set (PBSS) Control Point (PCP) or Access Point (AP) (PCP/AP) station STA.

Example 30 includes the subject matter of Example 23, and optionally, wherein the frame comprises a Sector Sweep (SSW) frame.

Example 31 includes the subject matter of Example 30, and optionally, wherein the SSW frame comprises an SSW feedback field comprising the EDMG supported field.

Example 32 includes the subject matter of Example 31, and optionally, wherein the EDMG supported field comprises a reserved bit of the SSW feedback field.

Example 33 includes the subject matter of any one of Examples 30-32, and optionally, wherein the wireless station comprises a non Personal Basic Service Set (PBSS) Control Point (PCP) or Access Point (AP) (non-PCP/AP) station (STA).

Example 34 includes the subject matter of any one of Examples 30-33, and optionally, wherein the controller is configured to cause the wireless station to transmit the SSW frame in response to a beacon frame from a Personal Basic Service Set (PBSS) Control Point (PCP) or Access Point (AP) (PCP/AP) station (STA).

Example 35 includes the subject matter of any one of Examples 23-34, and optionally, wherein the EDMG supported field comprises a 1-bit field.

Example 36 includes the subject matter of any one of Examples 23-35, and optionally, wherein the controller is configured to cause the wireless station to set the EDMG supported field to 1.

Example 37 includes the subject matter of Example 23, and optionally, wherein the frame comprises an EDMG capability element comprising a station (STA) type field comprising the EDMG supported field.

Example 38 includes the subject matter of Example 37, and optionally, wherein the STA type field comprises a three-bit field.

Example 39 includes the subject matter of Example 37 or 38, and optionally, wherein the STA type field comprises a value of zero to indicate that the wireless station supports one or more EDMG features.

Example 40 includes the subject matter of any one of Examples 37-39, and optionally, wherein the EDMG capability element comprises a STA dependent capabilities field to indicate one or more EDMG capabilities of the wireless station.

Example 41 includes the subject matter of Example 40, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 42 includes the subject matter of any one of Examples 37-39, and optionally, wherein the EDMG capability element comprises a compressed EDMG capability element having a size of 4 octets.

Example 43 includes a method to be performed at a wireless station, the method comprising generating a frame having a structure compatible with a Directional Multi Gigabit (DMG) frame structure, the frame comprising an Enhanced DMG (EDMG) supported field to indicate that the wireless station supports one or more EDMG features; and transmitting the frame over a DMG channel.

Example 44 includes the subject matter of Example 43, and optionally, wherein the frame comprises a beacon frame.

Example 45 includes the subject matter of Example 44, and optionally, wherein the beacon frame comprises a DMG parameters field comprising the EDMG supported field.

Example 46 includes the subject matter of Example 45, and optionally, wherein the EDMG supported field comprises a reserved bit of the DMG parameters field.

Example 47 includes the subject matter of Example 46, and optionally, comprising setting the EDMG supported field to 1.

Example 48 includes the subject matter of Example 44, and optionally, wherein the beacon frame comprises a beacon interval control field comprising the EDMG supported field.

Example 49 includes the subject matter of any one of Examples 44-48, and optionally, wherein the wireless station comprises a Personal Basic Service Set (PBSS) Control Point (PCP) or Access Point (AP) (PCP/AP) station STA.

Example 50 includes the subject matter of Example 43, and optionally, wherein the frame comprises a Sector Sweep (SSW) frame.

Example 51 includes the subject matter of Example 50, and optionally, wherein the SSW frame comprises an SSW feedback field comprising the EDMG supported field.

Example 52 includes the subject matter of Example 51, and optionally, wherein the EDMG supported field comprises a reserved bit of the SSW feedback field.

Example 53 includes the subject matter of any one of Examples 50-52, and optionally, wherein the wireless station comprises a non Personal Basic Service Set (PBSS) Control Point (PCP) or Access Point (AP) (non-PCP/AP) station (STA).

Example 54 includes the subject matter of any one of Examples 50-53, and optionally, comprising transmitting the SSW frame in response to a beacon frame from a Personal Basic Service Set (PBSS) Control Point (PCP) or Access Point (AP) (PCP/AP) station (STA).

Example 55 includes the subject matter of any one of Examples 43-54, and optionally, wherein the EDMG supported field comprises a 1-bit field.

Example 56 includes the subject matter of any one of Examples 43-55, and optionally, comprising setting the EDMG supported field to 1.

Example 57 includes the subject matter of Example 43, and optionally, wherein the frame comprises an EDMG capability element comprising a station (STA) type field comprising the EDMG supported field.

Example 58 includes the subject matter of Example 57, and optionally, wherein the STA type field comprises a three-bit field.

Example 59 includes the subject matter of Example 57 or 58, and optionally, wherein the STA type field comprises a value of zero to indicate that the wireless station supports one or more EDMG features.

Example 60 includes the subject matter of any one of Examples 57-59, and optionally, wherein the EDMG capability element comprises a STA dependent capabilities field to indicate one or more EDMG capabilities of the wireless station.

Example 61 includes the subject matter of Example 60, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 62 includes the subject matter of any one of Examples 57-59, and optionally, wherein the EDMG capability element comprises a compressed EDMG capability element having a size of 4 octets.

Example 63 includes a product comprising one or more tangible computer-readable non-transitory storage media comprising computer-executable instructions operable to, when executed by at least one computer processor, enable the at least one computer processor to implement operations at a wireless station, the operations comprising generating a frame having a structure compatible with a Directional Multi Gigabit (DMG) frame structure, the frame comprising an Enhanced DMG (EDMG) supported field to indicate that the wireless station supports one or more EDMG features; and transmitting the frame over a DMG channel.

Example 64 includes the subject matter of Example 63, and optionally, wherein the frame comprises a beacon frame.

Example 65 includes the subject matter of Example 64, and optionally, wherein the beacon frame comprises a DMG parameters field comprising the EDMG supported field.

Example 66 includes the subject matter of Example 65, and optionally, wherein the EDMG supported field comprises a reserved bit of the DMG parameters field.

Example 67 includes the subject matter of Example 66, and optionally, wherein the operations comprise setting the EDMG supported field to 1.

Example 68 includes the subject matter of Example 64, and optionally, wherein the beacon frame comprises a beacon interval control field comprising the EDMG supported field.

Example 69 includes the subject matter of any one of Examples 64-68, and optionally, wherein the wireless station comprises a Personal Basic Service Set (PBSS) Control Point (PCP) or Access Point (AP) (PCP/AP) station STA.

Example 70 includes the subject matter of Example 63, and optionally, wherein the frame comprises a Sector Sweep (SSW) frame.

Example 71 includes the subject matter of Example 70, and optionally, wherein the SSW frame comprises an SSW feedback field comprising the EDMG supported field.

Example 72 includes the subject matter of Example 71, and optionally, wherein the EDMG supported field comprises a reserved bit of the SSW feedback field.

Example 73 includes the subject matter of any one of Examples 70-72, and optionally, wherein the wireless station comprises a non Personal Basic Service Set (PBSS) Control Point (PCP) or Access Point (AP) (non-PCP/AP) station (STA).

Example 74 includes the subject matter of any one of Examples 70-73, and optionally, wherein the operations comprise transmitting the SSW frame in response to a beacon frame from a Personal Basic Service Set (PBSS) Control Point (PCP) or Access Point (AP) (PCP/AP) station (STA).

Example 75 includes the subject matter of any one of Examples 63-74, and optionally, wherein the EDMG supported field comprises a 1-bit field.

Example 76 includes the subject matter of any one of Examples 63-75, and optionally, wherein the operations comprise setting the EDMG supported field to 1.

Example 77 includes the subject matter of Example 63, and optionally, wherein the frame comprises an EDMG capability element comprising a station (STA) type field comprising the EDMG supported field.

Example 78 includes the subject matter of Example 77, and optionally, wherein the STA type field comprises a three-bit field.

Example 79 includes the subject matter of Example 77 or 78, and optionally, wherein the STA type field comprises a value of zero to indicate that the wireless station supports one or more EDMG features.

Example 80 includes the subject matter of any one of Examples 77-79, and optionally, wherein the EDMG capability element comprises a STA dependent capabilities field to indicate one or more EDMG capabilities of the wireless station.

Example 81 includes the subject matter of Example 80, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 82 includes the subject matter of any one of Examples 77-79, and optionally, wherein the EDMG capability element comprises a compressed EDMG capability element having a size of 4 octets.

Example 83 includes an apparatus of wireless communication by a wireless station, the apparatus comprising means for generating a frame having a structure compatible with a Directional Multi Gigabit (DMG) frame structure, the frame comprising an Enhanced DMG (EDMG) supported field to indicate that the wireless station supports one or more EDMG features; and means for transmitting the frame over a DMG channel.

Example 84 includes the subject matter of Example 83, and optionally, wherein the frame comprises a beacon frame.

Example 85 includes the subject matter of Example 84, and optionally, wherein the beacon frame comprises a DMG parameters field comprising the EDMG supported field.

Example 86 includes the subject matter of Example 85, and optionally, wherein the EDMG supported field comprises a reserved bit of the DMG parameters field.

Example 87 includes the subject matter of Example 86, and optionally, comprising means for setting the EDMG supported field to 1.

Example 88 includes the subject matter of Example 84, and optionally, wherein the beacon frame comprises a beacon interval control field comprising the EDMG supported field.

Example 89 includes the subject matter of any one of Examples 84-88, and optionally, wherein the wireless station comprises a Personal Basic Service Set (PBSS) Control Point (PCP) or Access Point (AP) (PCP/AP) station STA.

Example 90 includes the subject matter of Example 83, and optionally, wherein the frame comprises a Sector Sweep (SSW) frame.

Example 91 includes the subject matter of Example 90, and optionally, wherein the SSW frame comprises an SSW feedback field comprising the EDMG supported field.

Example 92 includes the subject matter of Example 91, and optionally, wherein the EDMG supported field comprises a reserved bit of the SSW feedback field.

Example 93 includes the subject matter of any one of Examples 90-92, and optionally, wherein the wireless station comprises a non Personal Basic Service Set (PBSS) Control Point (PCP) or Access Point (AP) (non-PCP/AP) station (STA).

Example 94 includes the subject matter of any one of Examples 90-93, and optionally, comprising means for transmitting the SSW frame in response to a beacon frame from a Personal Basic Service Set (PBSS) Control Point (PCP) or Access Point (AP) (PCP/AP) station (STA).

Example 95 includes the subject matter of any one of Examples 83-94, and optionally, wherein the EDMG supported field comprises a 1-bit field.

Example 96 includes the subject matter of any one of Examples 83-95, and optionally, comprising means for setting the EDMG supported field to 1.

Example 97 includes the subject matter of Example 83, and optionally, wherein the frame comprises an EDMG capability element comprising a station (STA) type field comprising the EDMG supported field.

Example 98 includes the subject matter of Example 97, and optionally, wherein the STA type field comprises a three-bit field.

Example 99 includes the subject matter of Example 97 or 98, and optionally, wherein the STA type field comprises a value of zero to indicate that the wireless station supports one or more EDMG features.

Example 100 includes the subject matter of any one of Examples 97-99, and optionally, wherein the EDMG capability element comprises a STA dependent capabilities field to indicate one or more EDMG capabilities of the wireless station.

Example 101 includes the subject matter of Example 100, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 102 includes the subject matter of any one of Examples 97-99, and optionally, wherein the EDMG capability element comprises a compressed EDMG capability element having a size of 4 octets.

Example 103 includes an apparatus comprising logic and circuitry configured to cause a first wireless station to process a frame from a second wireless station over a Directional Multi Gigabit (DMG) channel, the frame having a structure compatible with a DMG frame structure; and communicate an Enhanced DMG (EDMG) communication with the second wireless station based on an EDMG supported field in the frame.

Example 104 includes the subject matter of Example 103, and optionally, wherein the frame comprises a beacon frame.

Example 105 includes the subject matter of Example 104, and optionally, wherein the beacon frame comprises a DMG parameters field comprising the EDMG supported field.

Example 106 includes the subject matter of Example 105, and optionally, wherein the EDMG supported field comprises a reserved bit of the DMG parameters field.

Example 107 includes the subject matter of any one of Examples 104-106, and optionally, wherein the EDMG supported field comprises a bit value of 1.

Example 108 includes the subject matter of Example 104, and optionally, wherein the beacon frame comprises a beacon interval control field comprising the EDMG supported field.

Example 109 includes the subject matter of any one of Examples 104-108, and optionally, wherein the first wireless station comprises a non Personal Basic Service Set (PBSS) Control Point (PCP) or Access Point (AP) (non-PCP/AP) station (STA).

Example 110 includes the subject matter of Example 103, and optionally, wherein the frame comprises a Sector Sweep (SSW) frame.

Example 111 includes the subject matter of Example 110, and optionally, wherein the SSW frame comprises an SSW feedback field comprising the EDMG supported field.

Example 112 includes the subject matter of Example 111, and optionally, wherein the EDMG supported field comprises a reserved bit of the SSW feedback field.

Example 113 includes the subject matter of any one of Examples 110-112, and optionally, wherein the first wireless station comprises a Personal Basic Service Set (PBSS) Control Point (PCP) or Access Point (AP) (PCP/AP).

Example 114 includes the subject matter of any one of Examples 110-113, and optionally, wherein the apparatus is configured to cause the first wireless station to transmit a beacon frame, the SSW frame is in response to the beacon frame.

Example 115 includes the subject matter of any one of Examples 103-114, and optionally, wherein the EDMG supported field comprises a 1-bit field.

Example 116 includes the subject matter of any one of Examples 103-115, and optionally, wherein the EDMG supported field comprises a bit value of 1.

Example 117 includes the subject matter of any one of Examples 103-116, and optionally, wherein the apparatus is configured to cause the first wireless station to communicate the EDMG communication with the second wireless station only if the EDMG supported field comprises a predefined value.

Example 118 includes the subject matter of any one of Examples 103-117, and optionally, wherein the apparatus is configured to cause the first wireless station to communicate the EDMG communication with the second wireless station only if the EDMG supported field indicates the second wireless station supports one or more EDMG features.

Example 119 includes the subject matter of any one of Examples 103-118, and optionally, wherein the apparatus is configured to cause the first wireless station to select not to communicate the EDMG communication with the second wireless station if the frame does not include the EDMG supported field to indicate the second wireless station supports one or more EDMG features.

Example 120 includes the subject matter of Example 103, and optionally, wherein the frame comprises an EDMG capability element comprising a station (STA) type field comprising the EDMG supported field.

Example 121 includes the subject matter of Example 120, and optionally, wherein the STA type field comprises a three-bit field.

Example 122 includes the subject matter of Example 120 or 121, and optionally, wherein the STA type field comprises a value of zero to indicate that the wireless station supports one or more EDMG features.

Example 123 includes the subject matter of any one of Examples 120-122, and optionally, wherein the EDMG capability element comprises a STA dependent capabilities field to indicate one or more EDMG capabilities of the wireless station.

Example 124 includes the subject matter of Example 123, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 125 includes the subject matter of any one of Examples 120-122, and optionally, wherein the EDMG capability element comprises a compressed EDMG capability element having a size of 4 octets.

Example 126 includes the subject matter of any one of Examples 103-125, and optionally, comprising a radio to receive the frame over the DMG channel.

Example 127 includes the subject matter of any one of Examples 103-126, and optionally, comprising one or more directional antennas, a memory, and a processor.

Example 128 includes a system of wireless communication comprising a first wireless station, the first wireless station comprising one or more directional antennas; a radio; a memory; a processor; and a controller configured to cause the first wireless station to process a frame from a second wireless station over a Directional Multi Gigabit (DMG) channel, the frame having a structure compatible with a DMG frame structure; and communicate an Enhanced DMG (EDMG) communication with the second wireless station based on an EDMG supported field in the frame.

Example 129 includes the subject matter of Example 128, and optionally, wherein the frame comprises a beacon frame.

Example 130 includes the subject matter of Example 129, and optionally, wherein the beacon frame comprises a DMG parameters field comprising the EDMG supported field.

Example 131 includes the subject matter of Example 130, and optionally, wherein the EDMG supported field comprises a reserved bit of the DMG parameters field.

Example 132 includes the subject matter of any one of Examples 129-131, and optionally, wherein the EDMG supported field comprises a bit value of 1.

Example 133 includes the subject matter of Example 129, and optionally, wherein the beacon frame comprises a beacon interval control field comprising the EDMG supported field.

Example 134 includes the subject matter of any one of Examples 129-133, and optionally, wherein the first wireless station comprises a non Personal Basic Service Set (PBSS) Control Point (PCP) or Access Point (AP) (non-PCP/AP) station (STA).

Example 135 includes the subject matter of Example 128, and optionally, wherein the frame comprises a Sector Sweep (SSW) frame.

Example 136 includes the subject matter of Example 135, and optionally, wherein the SSW frame comprises an SSW feedback field comprising the EDMG supported field.

Example 137 includes the subject matter of Example 136, and optionally, wherein the EDMG supported field comprises a reserved bit of the SSW feedback field.

Example 138 includes the subject matter of any one of Examples 135-137, and optionally, wherein the first wireless station comprises a Personal Basic Service Set (PBSS) Control Point (PCP) or Access Point (AP) (PCP/AP).

Example 139 includes the subject matter of any one of Examples 135-138, and optionally, wherein the controller is configured to cause the first wireless station to transmit a beacon frame, the SSW frame is in response to the beacon frame.

Example 140 includes the subject matter of any one of Examples 128-139, and optionally, wherein the EDMG supported field comprises a 1-bit field.

Example 141 includes the subject matter of any one of Examples 128-140, and optionally, wherein the EDMG supported field comprises a bit value of 1.

Example 142 includes the subject matter of any one of Examples 128-141, and optionally, wherein the controller is configured to cause the first wireless station to communicate the EDMG communication with the second wireless station only if the EDMG supported field comprises a predefined value.

Example 143 includes the subject matter of any one of Examples 128-142, and optionally, wherein the controller is configured to cause the first wireless station to communicate the EDMG communication with the second wireless station only if the EDMG supported field indicates the second wireless station supports one or more EDMG features.

Example 144 includes the subject matter of any one of Examples 128-143, and optionally, wherein the controller is configured to cause the first wireless station to select not to communicate the EDMG communication with the second wireless station if the frame does not include the EDMG supported field to indicate the second wireless station supports one or more EDMG features.

Example 145 includes the subject matter of Example 128, and optionally, wherein the frame comprises an EDMG capability element comprising a station (STA) type field comprising the EDMG supported field.

Example 146 includes the subject matter of Example 145, and optionally, wherein the STA type field comprises a three-bit field.

Example 147 includes the subject matter of Example 145 or 146, and optionally, wherein the STA type field comprises a value of zero to indicate that the wireless station supports one or more EDMG features.

Example 148 includes the subject matter of any one of Examples 145-147, and optionally, wherein the EDMG capability element comprises a STA dependent capabilities field to indicate one or more EDMG capabilities of the wireless station.

Example 149 includes the subject matter of Example 148, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 150 includes the subject matter of any one of Examples 145-147, and optionally, wherein the EDMG capability element comprises a compressed EDMG capability element having a size of 4 octets.

Example 151 includes a method to be performed at a first wireless station, the method comprising processing a frame from a second wireless station over a Directional Multi Gigabit (DMG) channel, the frame having a structure compatible with a DMG frame structure; and communicating an Enhanced DMG (EDMG) communication with the second wireless station based on an EDMG supported field in the frame.

Example 152 includes the subject matter of Example 151, and optionally, wherein the frame comprises a beacon frame.

Example 153 includes the subject matter of Example 152, and optionally, wherein the beacon frame comprises a DMG parameters field comprising the EDMG supported field.

Example 154 includes the subject matter of Example 153, and optionally, wherein the EDMG supported field comprises a reserved bit of the DMG parameters field.

Example 155 includes the subject matter of any one of Examples 152-154, and optionally, wherein the EDMG supported field comprises a bit value of 1.

Example 156 includes the subject matter of Example 152, and optionally, wherein the beacon frame comprises a beacon interval control field comprising the EDMG supported field.

Example 157 includes the subject matter of any one of Examples 152-156, and optionally, wherein the first wireless station comprises a non Personal Basic Service Set (PBSS) Control Point (PCP) or Access Point (AP) (non-PCP/AP) station (STA).

Example 158 includes the subject matter of Example 151, and optionally, wherein the frame comprises a Sector Sweep (SSW) frame.

Example 159 includes the subject matter of Example 158, and optionally, wherein the SSW frame comprises an SSW feedback field comprising the EDMG supported field.

Example 160 includes the subject matter of Example 159, and optionally, wherein the EDMG supported field comprises a reserved bit of the SSW feedback field.

Example 161 includes the subject matter of any one of Examples 158-160, and optionally, wherein the first wireless station comprises a Personal Basic Service Set (PBSS) Control Point (PCP) or Access Point (AP) (PCP/AP).

Example 162 includes the subject matter of any one of Examples 158-161, and optionally, comprising transmitting a beacon frame, the SSW frame is in response to the beacon frame.

Example 163 includes the subject matter of any one of Examples 151-162, and optionally, wherein the EDMG supported field comprises a 1-bit field.

Example 164 includes the subject matter of any one of Examples 151-163, and optionally, wherein the EDMG supported field comprises a bit value of 1.

Example 165 includes the subject matter of any one of Examples 151-164, and optionally, comprising communicating the EDMG communication with the second wireless station only if the EDMG supported field comprises a predefined value.

Example 166 includes the subject matter of any one of Examples 151-165, and optionally, comprising communicating the EDMG communication with the second wireless station only if the EDMG supported field indicates the second wireless station supports one or more EDMG features.

Example 167 includes the subject matter of any one of Examples 151-166, and optionally, comprising selecting not to communicate the EDMG communication with the second wireless station if the frame does not include the EDMG supported field to indicate the second wireless station supports one or more EDMG features.

Example 168 includes the subject matter of Example 151, and optionally, wherein the frame comprises an EDMG capability element comprising a station (STA) type field comprising the EDMG supported field.

Example 169 includes the subject matter of Example 168, and optionally, wherein the STA type field comprises a three-bit field.

Example 170 includes the subject matter of Example 168 or 169, and optionally, wherein the STA type field comprises a value of zero to indicate that the wireless station supports one or more EDMG features.

Example 171 includes the subject matter of any one of Examples 168-170, and optionally, wherein the EDMG capability element comprises a STA dependent capabilities field to indicate one or more EDMG capabilities of the wireless station.

Example 172 includes the subject matter of Example 171, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 173 includes the subject matter of any one of Examples 168-170, and optionally, wherein the EDMG capability element comprises a compressed EDMG capability element having a size of 4 octets.

Example 174 includes a product comprising one or more tangible computer-readable non-transitory storage media comprising computer-executable instructions operable to, when executed by at least one computer processor, enable the at least one computer processor to implement operations at a first wireless station, the operations comprising processing a frame from a second wireless station over a Directional Multi Gigabit (DMG) channel, the frame having a structure compatible with a DMG frame structure; and communicating an Enhanced DMG (EDMG) communication with the second wireless station based on an EDMG supported field in the frame.

Example 175 includes the subject matter of Example 174, and optionally, wherein the frame comprises a beacon frame.

Example 176 includes the subject matter of Example 175, and optionally, wherein the beacon frame comprises a DMG parameters field comprising the EDMG supported field.

Example 177 includes the subject matter of Example 176, and optionally, wherein the EDMG supported field comprises a reserved bit of the DMG parameters field.

Example 178 includes the subject matter of any one of Examples 175-177, and optionally, wherein the EDMG supported field comprises a bit value of 1.

Example 179 includes the subject matter of Example 175, and optionally, wherein the beacon frame comprises a beacon interval control field comprising the EDMG supported field.

Example 180 includes the subject matter of any one of Examples 175-179, and optionally, wherein the first wireless station comprises a non Personal Basic Service Set (PBSS) Control Point (PCP) or Access Point (AP) (non-PCP/AP) station (STA).

Example 181 includes the subject matter of Example 174, and optionally, wherein the frame comprises a Sector Sweep (SSW) frame.

Example 182 includes the subject matter of Example 181, and optionally, wherein the SSW frame comprises an SSW feedback field comprising the EDMG supported field.

Example 183 includes the subject matter of Example 182, and optionally, wherein the EDMG supported field comprises a reserved bit of the SSW feedback field.

Example 184 includes the subject matter of any one of Examples 181-183, and optionally, wherein the first wireless station comprises a Personal Basic Service Set (PBSS) Control Point (PCP) or Access Point (AP) (PCP/AP).

Example 185 includes the subject matter of any one of Examples 181-184, and optionally, wherein the operations comprise transmitting a beacon frame, the SSW frame is in response to the beacon frame.

Example 186 includes the subject matter of any one of Examples 174-185, and optionally, wherein the EDMG supported field comprises a 1-bit field.

Example 187 includes the subject matter of any one of Examples 174-186, and optionally, wherein the EDMG supported field comprises a bit value of 1.

Example 188 includes the subject matter of any one of Examples 174-187, and optionally, wherein the operations comprise communicating the EDMG communication with the second wireless station only if the EDMG supported field comprises a predefined value.

Example 189 includes the subject matter of any one of Examples 174-188, and optionally, wherein the operations comprise communicating the EDMG communication with the second wireless station only if the EDMG supported field indicates the second wireless station supports one or more EDMG features.

Example 190 includes the subject matter of any one of Examples 174-189, and optionally, wherein the operations comprise selecting not to communicate the EDMG communication with the second wireless station if the frame does not include the EDMG supported field to indicate the second wireless station supports one or more EDMG features.

Example 191 includes the subject matter of Example 174, and optionally, wherein the frame comprises an EDMG capability element comprising a station (STA) type field comprising the EDMG supported field.

Example 192 includes the subject matter of Example 191, and optionally, wherein the STA type field comprises a three-bit field.

Example 193 includes the subject matter of Example 191 or 192, and optionally, wherein the STA type field comprises a value of zero to indicate that the wireless station supports one or more EDMG features.

Example 194 includes the subject matter of any one of Examples 191-193, and optionally, wherein the EDMG capability element comprises a STA dependent capabilities field to indicate one or more EDMG capabilities of the wireless station.

Example 195 includes the subject matter of Example 194, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 196 includes the subject matter of any one of Examples 191-193, and optionally, wherein the EDMG capability element comprises a compressed EDMG capability element having a size of 4 octets.

Example 197 includes an apparatus of wireless communication by a first wireless station, the apparatus comprising means for processing a frame from a second wireless station over a Directional Multi Gigabit (DMG) channel, the frame having a structure compatible with a DMG frame structure; and means for communicating an Enhanced DMG (EDMG) communication with the second wireless station based on an EDMG supported field in the frame.

Example 198 includes the subject matter of Example 197, and optionally, wherein the frame comprises a beacon frame.

Example 199 includes the subject matter of Example 198, and optionally, wherein the beacon frame comprises a DMG parameters field comprising the EDMG supported field.

Example 200 includes the subject matter of Example 199, and optionally, wherein the EDMG supported field comprises a reserved bit of the DMG parameters field.

Example 201 includes the subject matter of any one of Examples 198-200, and optionally, wherein the EDMG supported field comprises a bit value of 1.

Example 202 includes the subject matter of Example 198, and optionally, wherein the beacon frame comprises a beacon interval control field comprising the EDMG supported field.

Example 203 includes the subject matter of any one of Examples 198-202, and optionally, wherein the first wireless station comprises a non Personal Basic Service Set (PBSS) Control Point (PCP) or Access Point (AP) (non-PCP/AP) station (STA).

Example 204 includes the subject matter of Example 197, and optionally, wherein the frame comprises a Sector Sweep (SSW) frame.

Example 205 includes the subject matter of Example 204, and optionally, wherein the SSW frame comprises an SSW feedback field comprising the EDMG supported field.

Example 206 includes the subject matter of Example 205, and optionally, wherein the EDMG supported field comprises a reserved bit of the SSW feedback field.

Example 207 includes the subject matter of any one of Examples 204-206, and optionally, wherein the first wireless station comprises a Personal Basic Service Set (PBSS) Control Point (PCP) or Access Point (AP) (PCP/AP).

Example 208 includes the subject matter of any one of Examples 204-207, and optionally, comprising means for transmitting a beacon frame, the SSW frame is in response to the beacon frame.

Example 209 includes the subject matter of any one of Examples 197-208, and optionally, wherein the EDMG supported field comprises a 1-bit field.

Example 210 includes the subject matter of any one of Examples 197-209, and optionally, wherein the EDMG supported field comprises a bit value of 1.

Example 211 includes the subject matter of any one of Examples 197-210, and optionally, comprising means for communicating the EDMG communication with the second wireless station only if the EDMG supported field comprises a predefined value.

Example 212 includes the subject matter of any one of Examples 197-211, and optionally, comprising means for communicating the EDMG communication with the second wireless station only if the EDMG supported field indicates the second wireless station supports one or more EDMG features.

Example 213 includes the subject matter of any one of Examples 197-212, and optionally, comprising means for selecting not to communicate the EDMG communication with the second wireless station if the frame does not include the EDMG supported field to indicate the second wireless station supports one or more EDMG features.

Example 214 includes the subject matter of Example 197, and optionally, wherein the frame comprises an EDMG capability element comprising a station (STA) type field comprising the EDMG supported field.

Example 215 includes the subject matter of Example 214, and optionally, wherein the STA type field comprises a three-bit field.

Example 216 includes the subject matter of Example 214 or 215, and optionally, wherein the STA type field comprises a value of zero to indicate that the wireless station supports one or more EDMG features.

Example 217 includes the subject matter of any one of Examples 214-216, and optionally, wherein the EDMG capability element comprises a STA dependent capabilities field to indicate one or more EDMG capabilities of the wireless station.

Example 218 includes the subject matter of Example 217, and optionally, wherein the STA dependent capabilities field comprises a hash value based on an EDMG capabilities element and a DMG capabilities element, the EDMG capabilities element representing the one or more EDMG capabilities of the wireless station, and the DMG capabilities element representing one or more DMG capabilities of the wireless station.

Example 219 includes the subject matter of any one of Examples 214-216, and optionally, wherein the EDMG capability element comprises a compressed EDMG capability element having a size of 4 octets.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a wireless communication station (STA) to:
   set an Enhanced Directional Multi Gigabit (DMG) (EDMG) supported field to a predefined value to indicate that the STA is an EDMG STA, which is a DMG STA and which supports EDMG communications, wherein the EMIG supported field comprises a single-bit field and the predefined value is "1";

transmit a DMG frame comprising a DMG parameters field, the DMG parameters field comprising the EDMG supported field set to the predefined value to indicate that the STA is the EDMG STA; and communicate an EDMG Physical Layer Protocol Data Unit (PPDU) over a channel in a frequency band above 45 Gigahertz (GHz).

2. The apparatus of claim 1, wherein the DMG frame comprises a beacon frame.

3. The apparatus of claim 1, wherein the DMG frame comprises a DMG beacon frame in an EDMG Basic Service Set (BSS).

4. The apparatus of claim 1, wherein the EDMG supported field is after a plurality of DMG fields in the DMG parameters field in the DMG frame.

5. The apparatus of claim 1 configured to cause the STA to perform the EDMG communications over at least a channel bandwidth of 4.32 GHz.

6. The apparatus of claim 1 configured to cause the STA to perform the EDMG communications over at least a channel bandwidth of 6.48 GHz.

7. The apparatus of claim 1 comprising a radio, the processor configured to cause the radio to transmit the DMG frame.

8. The apparatus of claim 7 comprising one or more antennas connected to the radio.

9. A product comprising one or more tangible computer-readable non-transitory storage media comprising computer-executable instructions operable to, when executed by at least one processor, enable the at least one processor to cause a wireless communication station (STA) to:

set an Enhanced Directional Multi Gigabit (DMG) (EDMG) supported field to a predefined value to indicate that the STA is an EDMG STA, which is a DMG STA and which supports EDMG communications, wherein the EDMG supported field comprises a single-bit field and the predefined value is "1";

transmit a DMG frame comprising a DMG parameters field, the DMG parameters field comprising the EDMG supported field set to the predefined value to indicate that the STA is the EDMG STA; and communicate an EDMG Physical Layer Protocol Data Unit (PPDU) over a channel in a frequency band above 45 Gigahertz (GHz).

10. The product of claim 9, wherein the DMG frame comprises a beacon frame.

11. The product of claim 9, wherein the DMG frame comprises a DMG beacon frame in an EDMG Basic Service Set (BSS).

12. The product of claim 9, wherein the EDMG supported field is after a plurality of DMG fields in the DMG parameters field in the DMG frame.

13. The product of claim 9, wherein the instructions, when executed, cause the STA to perform the EDMG communications over at least a channel bandwidth of 4.32 GHz.

14. The product of claim 9, wherein the instructions, when executed, cause the STA to perform the EDMG communications over at least a channel bandwidth of 6.48 GHz.

15. An apparatus comprising:

means for causing a wireless communication station (STA) to set an Enhanced Directional Multi Gigabit (DMG) (EDMG) supported field to a predefined value to indicate that the STA is an EDMG STA, which is a DMG STA and which supports EDMG communications, wherein the EDMG supported field comprises a single-bit field and the predefined value is "1";

means for causing the STA to transmit a DMG frame comprising a DMG parameters field, the DMG parameters field comprising the EDMG supported field set to the predefined value to indicate that the STA is the EDMG STA; and means for causing the STA to communicate an EDMG Physical Layer Protocol Data Unit (PPDU) over a channel in a frequency band above 45 Gigahertz (GHz).

16. The apparatus of claim 15, wherein the DMG frame comprises a DMG beacon frame in an EDMG Basic Service Set (BSS).

* * * * *

UNITED STATES PATENT AND TRADEMARK OFFICE
CERTIFICATE OF CORRECTION

PATENT NO. : 10,772,098 B2
APPLICATION NO. : 16/112725
DATED : September 8, 2020
INVENTOR(S) : Carlos Cordeiro et al.

Page 1 of 1

It is certified that error appears in the above-identified patent and that said Letters Patent is hereby corrected as shown below:

In the Claims

In Column 39, Line 3, in Claim 1, delete "EMIG" and insert -- EDMG --, therefor.

Signed and Sealed this
Fifth Day of January, 2021

Andrei Iancu
*Director of the United States Patent and Trademark Office*